(12) United States Patent
Chen

(10) Patent No.: US 7,661,838 B2
(45) Date of Patent: Feb. 16, 2010

(54) SOLAR POWERED DECORATIVE LIGHT SYSTEM

(75) Inventor: Chi Gon Chen, Roanoke, TX (US)

(73) Assignee: International Development LLC, Roanoke, TX (US)

( * ) Notice: Subject to any disclaimer, the term of this patent is extended or adjusted under 35 U.S.C. 154(b) by 64 days.

(21) Appl. No.: 11/964,707

(22) Filed: Dec. 26, 2007

(65) Prior Publication Data

US 2008/0158865 A1    Jul. 3, 2008

Related U.S. Application Data

(60) Provisional application No. 60/877,219, filed on Dec. 26, 2006.

(51) Int. Cl.
*F21S 9/00* (2006.01)
*F21S 4/00* (2006.01)

(52) U.S. Cl. ................. 362/183; 362/153; 362/431

(58) Field of Classification Search ............. 362/183, 362/153, 153.1, 431
See application file for complete search history.

(56) References Cited

U.S. PATENT DOCUMENTS

| 6,004,002 A * | 12/1999 | Giannone ............. 362/183 |
| 7,021,787 B1 * | 4/2006 | Kuelbs ................. 362/183 |
| 2006/0012978 A1 * | 1/2006 | Allsop et al. ........... 362/183 |
| 2007/0056625 A1 * | 3/2007 | Higuchi et al. ......... 136/244 |
| 2007/0159836 A1 * | 7/2007 | Huang et al. .......... 362/431 |
| 2007/0171634 A1 * | 7/2007 | Kao .................... 362/192 |

\* cited by examiner

*Primary Examiner*—Stephen F Husar
*Assistant Examiner*—Peggy A. Neils
(74) *Attorney, Agent, or Firm*—David W. Carstens; Carstens & Cahoon, LLP

(57) ABSTRACT

An improved solar powered decorative light system that can used on cloudy days and does not require the use of individual solar panels associated with each light in a decorative outdoor home holiday display. The improved solar powered decorative light system includes a plurality of decorative outdoor lights each having at least one LED and receiving electrical energy for illumination from a single solar receptor comprised of a double junction amorphous panel set. The decorative outdoor lights may further include replaceable decorative covers.

19 Claims, 2 Drawing Sheets

SOLAR POWERED DECORATIVE LIGHT SYSTEM

CROSS-REFERENCE TO RELATED APPLICATION

This application claims the benefit of and priority to a U.S. Provisional Patent Application No. 60/877,219 filed Dec. 26, 2006, the technical disclosure of which is hereby incorporated herein by reference.

BACKGROUND OF THE INVENTION

1. Technical Field of the Invention

The present invention pertains to solar powered outdoor lighting; more particularly, the present invention pertains to outdoor solar powered decorative lighting systems typically used for outdoor residential decoration during various holiday periods.

2. Description of the Related Art

The decoration of the outside of homes during the Christmas, Hannukah, New Year's period is an American tradition that has been and continues to be maintained. While home holiday decorations started as simple wreaths and garlands, the addition of electric lights to holiday decorations has added a whole new dimension to the types of outdoor decorations available. In some communities residents compete with one another for the best decorations. In still other communities holiday decorating has grown to the point where tour hours are set and outsiders are invited in to view elaborate home holiday decorations. Interestingly, holiday decorating has now grown to the point when many homeowners actually pay for professional decorators to put and take down home holiday decorations.

The growth of holiday decorating activity has now moved beyond the Christmas, Hannukah, New Year's period into other holidays. For example, in recent years, many homeowners are using lighted displays to decorate their homes around the time of Halloween on October 31. Others decorate for the Thanksgiving holiday.

Residential decorations are typically most attractive during the evening hours when lighted decorations can be best seen. To create an effective display of lighted decorations, many home owners must make the proper electrical connections each evening to assure that all of the lights are properly powered. Such effort is often inconvenient for home owners; particularly homeowners in the more Northern parts of the country as the evening hours are when many homeowners are just returning home from work.

Another consideration for homeowners is the rising price of electrical power. Many displays, even those of modest size, can have a noticeable impact on a homeowner's electric bill.

Yet another consideration is that in many parts of the country the weather in late autumn and in winter is characterized by cloudy days without direct sunlight. The impact on the absence of direct sunlight is that most solar panels, particularly crystalline solar panels, require direct sunlight to be effective. In addition, the low power output of crystalline solar panels typically requires an individual solar panel to be associated with each light used in a home holiday display formed of multiple solar powered lights.

Accordingly, there remains a need in the alt for an easy to use outdoor solar powered decorative light system that can used on cloudy days that does not require the use of individual solar panels associated with each light in a decorative outdoor home holiday display.

SUMMARY OF THE INVENTION

The present invention comprises an improved solar powered decorative light system that can used on cloudy days and does not require the use of individual solar panels associated with each light in a decorative outdoor home holiday display. The improved solar powered decorative light system includes a plurality of decorative outdoor lights each having at least one LED and receiving electrical energy for illumination from a single solar receptor comprised of a double junction amorphous panel set. The decorative outdoor lights may further include replaceable decorative covers.

BRIEF DESCRIPTION OF THE DRAWINGS

A better understanding of the outdoor solar powered decorative light system of the present invention may be had by reference to the attached drawing figures wherein.

Figure 1:
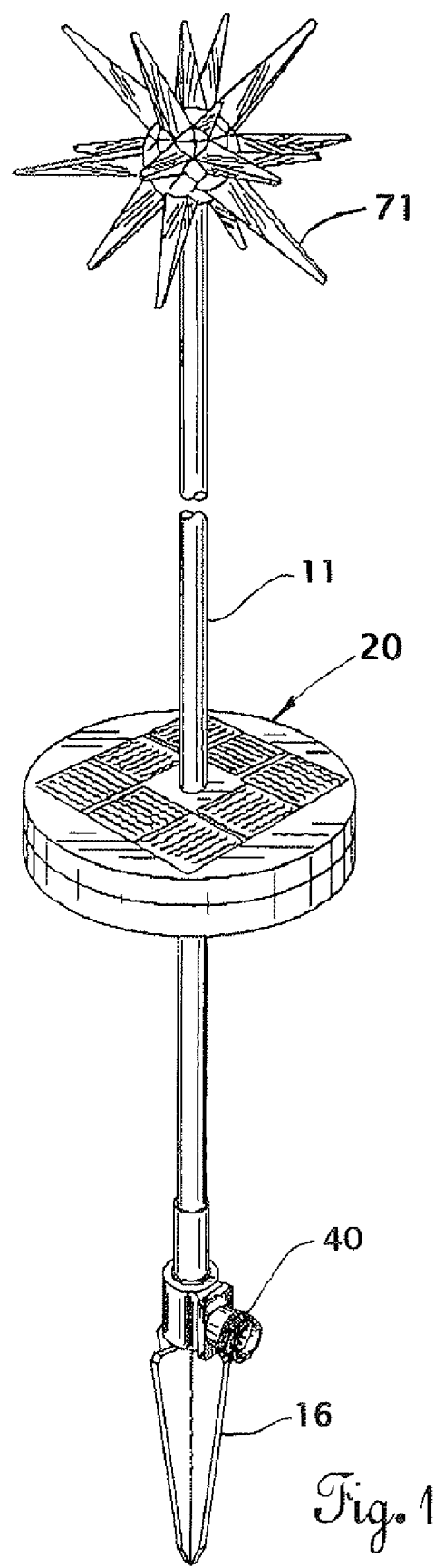
FIG. 1 is a top perspective view of the solar power source affixed to one of the mounting poles for a light.
Figure 2:
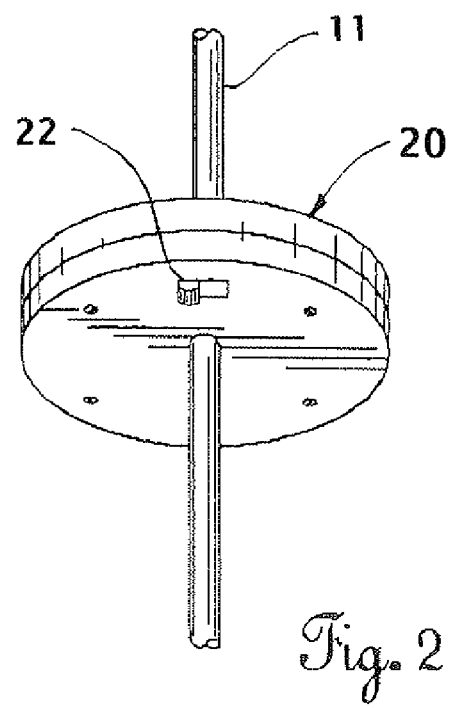
FIG. 2 is a bottom perspective view of the solar power source.

Where used in the various figures of the drawing, the same numerals designate the same or similar pails. Furthermore, when the terms "top," "bottom," "first," "second," "upper," "lower," "height," "width," "length," "end," "side," "horizontal," "vertical," and similar terms are used herein, it should be understood that these terms have reference only to the structure shown in the drawing and are utilized only to facilitate describing the invention.

All figures are drawn for ease of explanation of the basic teachings of the present invention only; the extensions of the figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

DETAILED DESCRIPTION OF THE INVENTION

Figure 3:
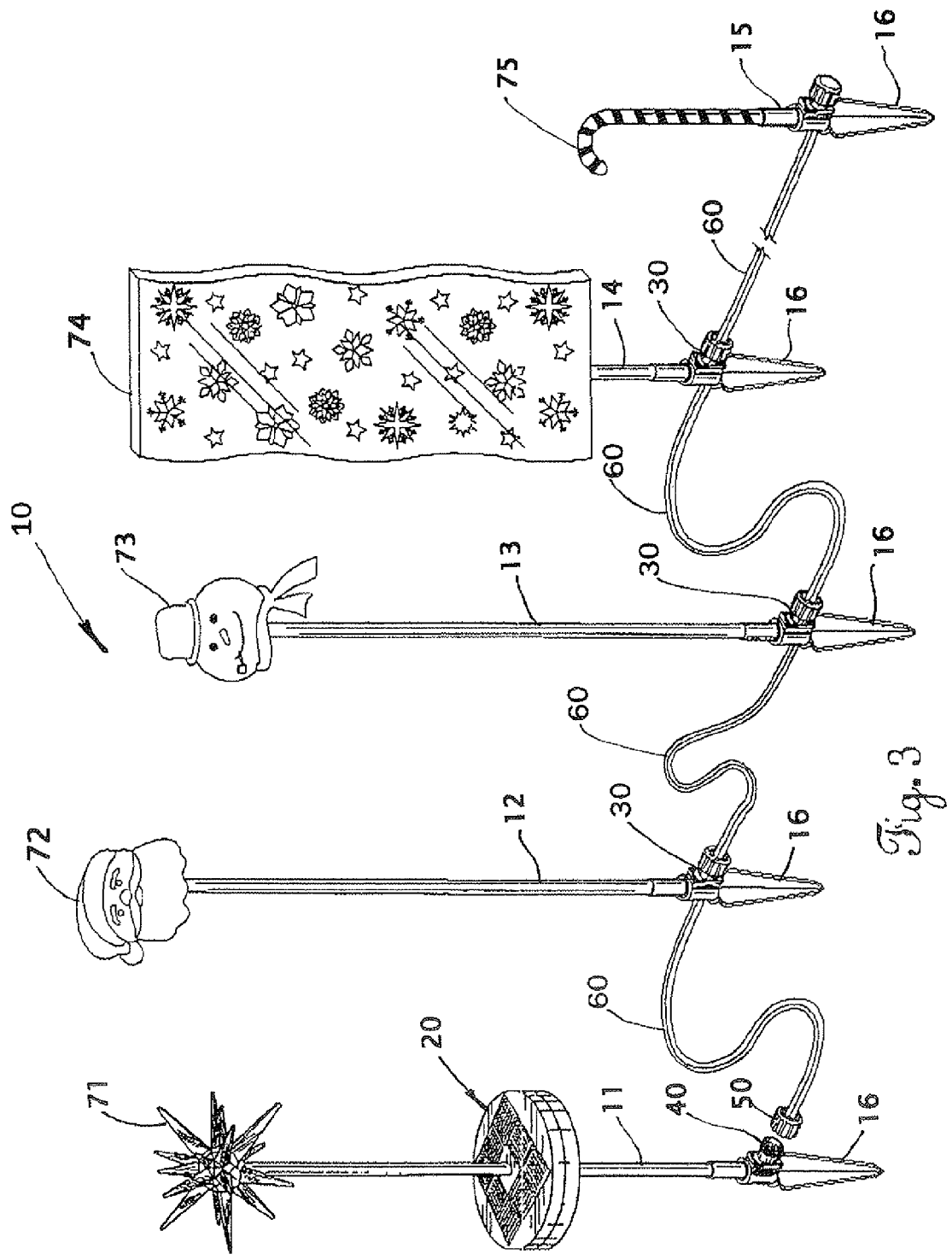
FIG. 3 is a perspective view of a set of decorative lights attached to mounting pole shown in FIG. 1.

The electrical power for the set of lights 10 shown in FIG. 3 is obtained from a single solar receptor assembly 20. In the preferred embodiment, the single solar receptor assembly 20 contains a double junction amorphous solar panel set.

The use of a double junction amorphous solar panel set in the solar receptor assembly 20 provides several advantages not provided by other solar powered decorative light sets. Specifically, by using a double junction amorphous solar panel set:

only one solar receptor is needed to power a set of multiple decorative lights;
 electrical power can be provided to the set of decorative lights even on cloudy days when there is no direct sunlight; and
 the single solar receptor may be placed in shady areas as direct sunlight is not needed for the double junction amorphous solar panel set to provide sufficient electrical energy to illuminate the set of decorative lights.

Another feature of the disclosed invention 10 is the connection 30 between individual decorative lights in the set of decorative lights. As shown in FIG. 3, at the bottom of each mounting post 11, 12, 13, 14, 15 just above the ground stake 16 is the female side 40 of an electrical connection 30. Connected to each female connection is the male side 50 of an electrical connection mounted to the end of a wire 60 extending from each mounting post. The female side 40 is surrounded by external threads and the male side has an internally threaded rotatable connector. It has been found that in most areas a set of up to six decorative lights can be connected together and operated using the double junction amorphous solar panel set.

Yet another feature of the disclosed invention is that one or more LED's are mounted to the top of each mounting pole 11, 12, 13, 14, 15. By using multiple LED's it is possible to change the color of light emanating from each set of LED's.

Additionally, the covers 71, 72, 73, 74, 75 over the LED's are replaceable. For example, if desired all of the LED's could be covered with snow man heads 73 or Moravian stars 71. In yet another arrangement specialty lights such as a candy cane 75 or a star array 74 as shown in FIG. 3 may be used.

Operation and installation of the set of lights 10 has been simplified to enable ease of use. Specifically, the homeowner places the mounting poles at their desired location and pushes the ground stake 16 into soil. The wires 60 connecting the mounting poles are physically and electrically connected one to another using the electrical connections 30 and wires 60 provided. Once the decorative covers are placed in a desired array over the LED'S, the switch 22 on the bottom of the double Junction amorphous solar panel set is turned on. The action of turning on the switch 22 will cause the electrical energy stored in a battery in solar receptor 20 to illuminate the lights. During the next period of daylight light energy will be converted into electrical energy by the double junction amorphous solar panel set to recharge the battery.

It will now be evident to those skilled in the art that there has been described herein an improved solar powered decorative light system that can used on cloudy days and does not require the use of individual solar panels associated with each light in a decorative outdoor home holiday display.

Although the invention hereof has been described by way of a preferred embodiment, it will be evident that other adaptations and modifications can be employed without departing from the spirit and scope thereof. For example, a timing mechanism may be incorporated into switch 22 to shut off the illumination the lights after a finite period of time. The terms and expressions employed herein have been used as terms of description and not of limitation; and thus, there is no intent of excluding equivalents, but on the contrary it is intended to cover any and all equivalents that may be employed without departing from the spirit and scope of the invention.

I claim:

1. A decorative outdoor light system comprising:
a first mounting post having a solar receptor affixed thereto and including at least one LED on one end and a first male electrical connection, said solar receptor including a double junction amorphous solar panel set in continuity with said at least one LED and said first male electrical connection;
a second mounting post having at least one LED on one end in continuity with a second electrical connection, said second electrical connection comprising a male side and a female side, said female side of the second electrical connection being selectively connected to said first male electrical connection of said first mounting post;
wherein the at least one LED on each of said first and second mounting posts receive electrical energy for illumination from said double junction amorphous panel set.

2. The decorative outdoor light system of claim 1 wherein each of said mounting posts includes a stake on the opposing end from said one or more LED's.

3. The decorative outdoor light system of claim 1, wherein said solar receptor further comprises a switch for selectively illuminating said set of decorative lights from said double junction amorphous panel set.

4. The decorative outdoor light system of claim 1, wherein said solar receptor further comprises a battery connected to said double junction amorphous panel set.

5. The decorative outdoor light system of claim 1, wherein said female side of said second electrical connection further includes a length wire.

6. The decorative outdoor light system of claim 1, wherein said female side of said second electrical connection is surrounded by external threads, and said first male electrical connection and said male side of said second electrical connection each comprise an internally threaded rotatable connectors complementary to the external threads of said female side of said second electrical connection.

7. The decorative outdoor light system of claim 1, wherein each of said first and second mounting posts further includes a cover over said at least one LED.

8. The decorative outdoor light system of claim 7, wherein said cover is removable and replaceable.

9. A set of decorative outdoor lights comprising:
a mounting pole having a solar receptor assembly affixed thereon, said receptor assembly including a double junction amorphous solar panel set,
said mounting pole including a first set of one or more LED's mounted on one end,
said first LED set being electrically connected to said solar receptor assembly;
said mounting pole further including an electrical connector, which is electrically connected to said solar receptor assembly;
a second set of one or more LED's, which is not mounted to said mounting pole but is electrically connected to said electrical connector;
wherein said solar receptor assembly provides electrical energy for illumination to said first and second LED sets.

10. The set of decorative outdoor lights of claim 9, wherein said mounting pole includes a stake on the end opposing the end said first LED set is mounted.

11. The set of decorative outdoor lights of claim 9, further comprising a switch for selectively illuminating said first and second LED sets from said solar receptor assembly.

12. A decorative outdoor light system comprising:
a first mourning post having a solar receptor assembly affixed thereto and including at least one LED mounted on one end and a first electrical connector, said solar receptor assembly including a double junction amorphous solar panel set electrically connected with said at least one LED and said first electrical connector; and
a second mourning post having at least one LED mounted on one end and a second electrical connector, said second electrical connector being selectively connected to said first electrical connector;
wherein the at least one LED on each of said first and second mounting posts receive electrical energy for illumination from said double junction amorphous panel set.

13. The decorative outdoor light system of claim 12 wherein each of said mounting posts includes a stake on the opposing end from said one or more LED's.

14. The decorative outdoor light system of claim 12, wherein said solar receptor further comprises a switch for selectively illuminating said set of decorative lights from said double junction amorphous panel set.

15. The decorative outdoor light system of claim 12, wherein said solar receptor further comprises a battery connected to said double junction amorphous panel set.

16. The decorative outdoor light system of claim 12, wherein said first and second electrical connectors are selectively connected each other by means of a length of wire.

17. The decorative outdoor light system of claim 12, wherein said second electrical connector is surrounded by external threads, and said first electrical connector comprises an internally threaded rotatable connector assembly that is complementary to the external threads of said second electrical connector.

18. The decorative outdoor light system of claim 12, wherein each of said first and second mounting posts further includes a cover over said at least one LED.

19. The decorative outdoor light system of claim 18, wherein said cover is removable and replaceable.

\* \* \* \* \*